M. RISLEY.
Improvement in Spectacle Frames.
No. 116,222. Patented June 20, 1871.
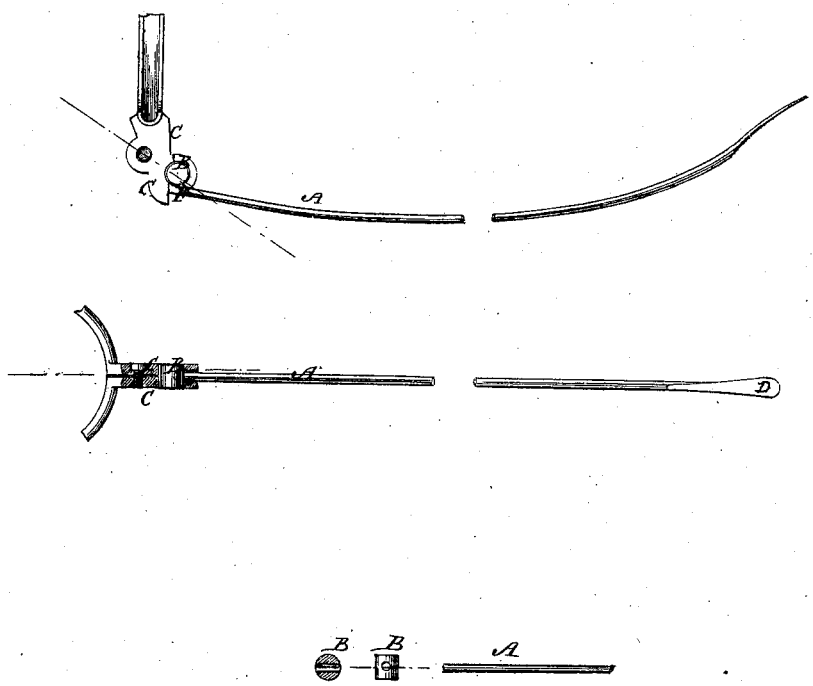
Witnesses:
Chas. Nida
Wm. H. C. Smith.
Inventor:
M. Risley.
per Munn & Co.
Attorneys.

UNITED STATES PATENT OFFICE.

MARTIN REISLEY, OF SPRINGFIELD, MASSACHUSETTS, ASSIGNOR TO SAMUEL D. BURBANK, OF SAME PLACE.

IMPROVEMENT IN SPECTACLE-FRAMES.

Specification forming part of Letters Patent No. 116,222, dated June 20, 1871.

*To all whom it may concern:*

Be it known that I, MARTIN REISLEY, of Springfield, in the county of Hampden and State of Massachusetts, have invented a new and useful Improvement in Spectacles; and I do hereby declare that the following is a full, clear, and exact description thereof, which will enable others skilled in the art to make and use the same, reference being had to the accompanying drawing forming part of this specification.

This invention relates to improvements in the construction of the frames of spectacles; and it consists in making the temples of drawn or rolled wire, with journals or trunnions for forming the joint with the bow of cylindrical pieces of wire also drawn or rolled, and larger than the temples, and attaching them by inserting the end of the latter in a hole punched or drilled through the cylinder and riveting the end or soldering the two. It also consists in the arrangement of these pivots to turn in the eyes in which they are received in the end pieces of the bow or glass-holding part, the object of which is to simplify and cheapen the cost and to provide stronger temples, especially at the junction with the trunnions.

The drawing represents two views of a temple constructed according to my invention, and sections of the bow. It also represents the two parts detached.

Up to the present time these temples have been mainly made in one piece, with an eye for the rivet of the joint, by cutting or punching them out of sheets and afterward finishing by twisting the end having the eye, filling, rolling, binding, &c., which is expensive in the labor required, and the temples are not as strong as they should be, for the metal must be soft to admit of punching, which laminates or disintegrates it to some extent; besides, the long thin punches, which are quite expensive to make, are liable to break. In other cases they have been formed by soldering a piece with an eye onto the temple; but, owing to the great difficulty of having the solder or the parts to be soldered always in the same condition, a large proportion fail for being imperfectly done.

Now, my plan, which consists in the attachment of the wire A to the cylindrical pieces B, for the trunnions or journals, by inserting the end of A in a hole, C, punched or drilled through B transversely, and soldering the two or riveting the end of A, admits of using drawn or condensed wire for both parts, thereby enabling me to employ stock in the toughest condition; and it requires less labor, for the wire, being drawn rapidly in great lengths, requires only to be cut in proper lengths and the part A to be flattened at one end, D, for the hole usually made there for attaching a string, and the other to be bent, as at F, for striking against the shoulder of the part to which the temple is joined to arrest it when opened; and the part B, being also drawn and cut in the right lengths, has only to be punched or drilled, and the two are ready to be put together and soldered or the end of A riveted. The ends D may be flattened and punched or not, as preferred. Moreover, by this arrangement, the pivots B, being made to turn in the eyes or bearings in the parts C, afford double the surface for resisting the wear of opening and closing, and the temple is much protected against working loose in the joint and loosing the necessary friction to hold it open. This results by reason of the trunnions preventing the temple from working laterally to the planes in which they swing.

By my construction the shoulder which stops the opening of the temple can be filed plain or burred straight across the bearing-pieces C, while in the ordinary spectacle the shoulder must be burred out in circular shape, at an increased cost, in order to admit the eye or journal-bearing of the temple.

Having thus described my invention, I claim as new and desire to secure by Letters Patent—

1. A spectacle-frame, having the temples A and the transverse trunnions B formed of drawn wire and secured together in the manner described, and with the said trunnions working in bearings cut through the ears or lugs C, substantially as shown and for the purpose set forth.

2. The temples of spectacles, having the trunnions or pivots B attached thereto and arranged to turn in the eyes or bearings in the parts C, substantially as specified.

The above specification of my invention signed by me this 28th day of December, 1870.

MARTIN REISLEY.

Witnesses:
HENRY W. BOSWORTH,
M. P. KNOWLTON.